US012801444B2

(12) United States Patent
Nagpal et al.

(10) Patent No.: US 12,801,444 B2
(45) Date of Patent: Nov. 17, 2026

(54) PROVISIONING COMPUTING RESOURCES ACROSS COMPUTING PLATFORMS

(71) Applicant: Nutanix, Inc., San Jose, CA (US)

(72) Inventors: Abhinay Nagpal, San Jose, CA (US); Vaidehi Hitesh Patel, San Jose, CA (US)

(73) Assignee: Nutanix, Inc., San Jose, CA (US)

( * ) Notice: Subject to any disclaimer, the term of this patent is extended or adjusted under 35 U.S.C. 154(b) by 395 days.

(21) Appl. No.: 17/443,839

(22) Filed: Jul. 28, 2021

(65) Prior Publication Data

US 2022/0156114 A1 May 19, 2022

Related U.S. Application Data

(60) Provisional application No. 63/115,447, filed on Nov. 18, 2020.

(51) Int. Cl.
*G06F 9/50* (2006.01)
*G06F 11/34* (2006.01)

(52) U.S. Cl.
CPC ............ *G06F 9/505* (2013.01); *G06F 9/5083* (2013.01); *G06F 11/3433* (2013.01)

(58) Field of Classification Search
CPC ..... G06F 9/505; G06F 9/5083; G06F 11/3433
See application file for complete search history.

(56) References Cited

U.S. PATENT DOCUMENTS

| | | | | |
|---|---|---|---|---|
| 8,549,518 | B1 | 10/2013 | Aron et al. | |
| 8,601,473 | B1 | 12/2013 | Aron et al. | |
| 8,615,589 | B1 * | 12/2013 | Adogla | G06F 9/5077 709/226 |
| 8,850,130 | B1 | 9/2014 | Aron et al. | |
| 8,863,124 | B1 | 10/2014 | Aron | |
| 9,009,106 | B1 | 4/2015 | Aron et al. | |
| 9,069,708 | B2 | 6/2015 | Gill et al. | |
| 9,336,132 | B1 | 5/2016 | Aron et al. | |
| 9,652,265 | B1 | 5/2017 | Narayanasamy et al. | |
| 9,747,287 | B1 | 8/2017 | Bhardwaj et al. | |
| 9,772,866 | B1 | 9/2017 | Aron et al. | |
| 9,921,827 | B1 * | 3/2018 | Evans | G06F 9/44536 |
| 10,511,481 | B1 * | 12/2019 | Castellanos | G06F 8/60 |
| 10,818,395 | B1 * | 10/2020 | Khalak | G06N 20/00 |
| 11,138,049 | B1 * | 10/2021 | Featonby | G06F 11/3447 |
| 11,336,519 | B1 * | 5/2022 | Greenwood | H04L 41/0816 |

(Continued)

OTHER PUBLICATIONS

Poitras, Steven , "The Nutanix Bible", https://nutanixbible.com/, Apr. 9, 2019, pp. all.

(Continued)

*Primary Examiner* — Benjamin C Wu

(74) *Attorney, Agent, or Firm* — Stoel Rives LLP

(57) ABSTRACT

This disclosure relates to resource allocation for workloads across computing environments and computing architectures. Computing resource usage of a workload is monitored, where the workload is executing on one or more processors of a first computing environment. One or more comparable workloads are identified based on the computing resource usage of the workload in the first environment. A suggested resource allocation for the workload in a second computing environment is generated based on characteristics of the one or more comparable workloads.

45 Claims, 8 Drawing Sheets

(56) References Cited

U.S. PATENT DOCUMENTS

| | | | | |
|---|---|---|---|---|
| 11,513,854 | B1 * | 11/2022 | Saxena | G06F 9/5088 |
| 12,008,408 | B2 * | 6/2024 | Toal | G06F 9/5083 |
| 2004/0230675 | A1 * | 11/2004 | Freimuth | H04L 47/11 709/223 |
| 2009/0265706 | A1 * | 10/2009 | Golosovker | G06F 9/4856 718/1 |
| 2011/0099266 | A1 | 4/2011 | Calder et al. | |
| 2011/0270968 | A1 | 11/2011 | Salsburg et al. | |
| 2012/0002614 | A1 * | 1/2012 | Ekici | H04W 72/1268 370/329 |
| 2012/0131577 | A1 * | 5/2012 | Arcese | G06F 9/44521 718/1 |
| 2012/0131593 | A1 | 5/2012 | Depetro | |
| 2012/0191630 | A1 * | 7/2012 | Breckenridge | G06N 20/00 706/12 |
| 2012/0284212 | A1 * | 11/2012 | Lin | G06N 20/00 706/12 |
| 2012/0284213 | A1 * | 11/2012 | Lin | G06N 20/00 714/E11.02 |
| 2013/0174149 | A1 * | 7/2013 | Dasgupta | G06F 9/5077 718/1 |
| 2013/0185722 | A1 * | 7/2013 | Kruglick | G06F 9/5027 718/1 |
| 2013/0212422 | A1 * | 8/2013 | Bauer | H04L 43/0805 714/57 |
| 2013/0232254 | A1 * | 9/2013 | Srikanth | H04L 43/06 709/224 |
| 2014/0201564 | A1 * | 7/2014 | Jagtiani | G06F 11/0712 714/4.11 |
| 2014/0223013 | A1 * | 8/2014 | Gaglianello | G06F 9/4856 709/226 |
| 2014/0280946 | A1 * | 9/2014 | Mukherjee | H04L 67/51 709/226 |
| 2015/0067294 | A1 * | 3/2015 | Hu | G06F 3/061 711/170 |
| 2015/0205542 | A1 * | 7/2015 | Antony | G06F 9/45558 711/162 |
| 2016/0232036 | A1 | 8/2016 | Zhu et al. | |
| 2017/0168729 | A1 * | 6/2017 | Faulkner | G06F 3/0613 |
| 2019/0065231 | A1 * | 2/2019 | Schmisseur | B25J 15/0014 |
| 2019/0065256 | A1 * | 2/2019 | Hamilton | G06F 9/505 |
| 2019/0235900 | A1 * | 8/2019 | Singh | G06F 3/0607 |
| 2020/0110691 | A1 * | 4/2020 | Bryant | G06F 11/3414 |
| 2020/0117508 | A1 * | 4/2020 | Subramanian | G06F 9/5005 |
| 2020/0183743 | A1 * | 6/2020 | Moore | G06F 9/5061 |
| 2020/0192707 | A1 * | 6/2020 | Brooker | G06F 11/3466 |
| 2020/0310852 | A1 * | 10/2020 | Featonby | G06F 9/5077 |
| 2021/0073034 | A1 * | 3/2021 | Bliesner | G06F 9/45558 |
| 2022/0156114 | A1 * | 5/2022 | Nagpal | G06F 11/3409 |
| 2023/0281051 | A1 * | 9/2023 | Martin | G06F 9/5038 718/102 |

OTHER PUBLICATIONS

Poitras, Steven. “The Nutanix Bible” (Oct. 15, 2013), from http://stevenpoitras.com/the-nutanix-bible/ (Publication date based on indicated capture date by Archive.org; first publication date unknown); pp. all.

Poitras, Steven. “The Nutanix Bible” (Jan. 11, 2014), from http://stevenpoitras.com/the-nutanix-bible/ (Publication date based on indicated capture date by Archive.org; first publication date unknown); pp. all.

Poitras, Steven. “The Nutanix Bible” (Jun. 20, 2014), from http://stevenpoitras.com/the-nutanix-bible/ (Publication date based on indicated capture date by Archive.org; first publication date unknown); pp. all.

Poitras, Steven. “The Nutanix Bible” (Jan. 7, 2015), from http://stevenpoitras.com/the-nutanix-bible/ (Publication date based on indicated capture date by Archive.org; first publication date unknown); pp. all.

Poitras, Steven. “The Nutanix Bible” (Jun. 9, 2015), from http://stevenpoitras.com/the-nutanix-bible/ (Publication date based on indicated capture date by Archive.org; first publication date unknown); pp. all.

Poitras, Steven. “The Nutanix Bible” (Sep. 4, 2015), from https://nutanixbible.com/; pp. all.

Poitras, Steven. “The Nutanix Bible” (Jan. 12, 2016), from https://nutanixbible.com/ ; pp. all.

Poitras, Steven. “The Nutanix Bible” (Jun. 9, 2016), from https://nutanixbible.com/; pp. all.

Poitras, Steven. “The Nutanix Bible” (Jan. 3, 2017), from https:/nutanixbible.com/; pp. all.

Poitras, Steven. “The Nutanix Bible” (Jun. 8, 2017), from https://nutanixbible.com/; pp. all.

Poitras, Steven. “The Nutanix Bible” (Jan. 3, 2018), from https://nutanixbible.com/; pp. all.

Poitras, Steven. “The Nutanix Bible” (Jun. 25, 2018), from https://nutanixbible.com/; pp. all.

Poitras, Steven. “The Nutanix Bible” (Jan. 8, 2019), from https://nutanixbible.com/; pp. all.

Poitras, Steven. “The Nutanix Bible” (Jul. 25, 2019), from https://nutanixbible.com/; pp. all.

Poitras, Steven. “The Nutanix Bible” (Sep. 17, 2019), from https://nutanixbible.com/; pp. all.

Cano, Ignacio et al. “Curator: Self-Managing Storage for Enterprise Clusters”; University of Washington; published Mar. 2017; pp. all.

Poitras, Steven. “The Nutanix Bible” (Mar. 2, 2020), from https://nutanixbible.com/; pp. all.

Poitras, Steven. “The Nutanix Bible” (Sep. 1, 2020), from https://nutanixbible.com/; pp. all.

Poitras, Steven. “The Nutanix Bible” (Mar. 2, 2021), from https://nutanixbible.com/; pp. all.

* cited by examiner

PROVISIONING COMPUTING RESOURCES ACROSS COMPUTING PLATFORMS

CROSS-REFERENCE TO RELATED APPLICATIONS

This application claims priority to Provisional Application No. 63/115,447, filed on Nov. 18, 2020. The aforementioned application is incorporated herein by reference, in its entirety, for any purpose.

BACKGROUND

Cloud computing provides various performance advantages, including the ability to distribute applications into workloads executed across cloud computing systems. However, users (e.g., enterprise users) may often overspend on cloud instances by overprovisioning the instances for the workloads actually being executed, resulting in additional cost and unused compute resources. It may be difficult for users to predict what instances may be best for a particular workload, especially when the workload has not yet been executed on a particular architecture. For example, when first moving a workload from an on premises computing cluster to a cloud computing platform with a different architecture, determining the proper instance for the workload in the cloud computing platform may be challenging.

DETAILED DESCRIPTION

Figure 1:
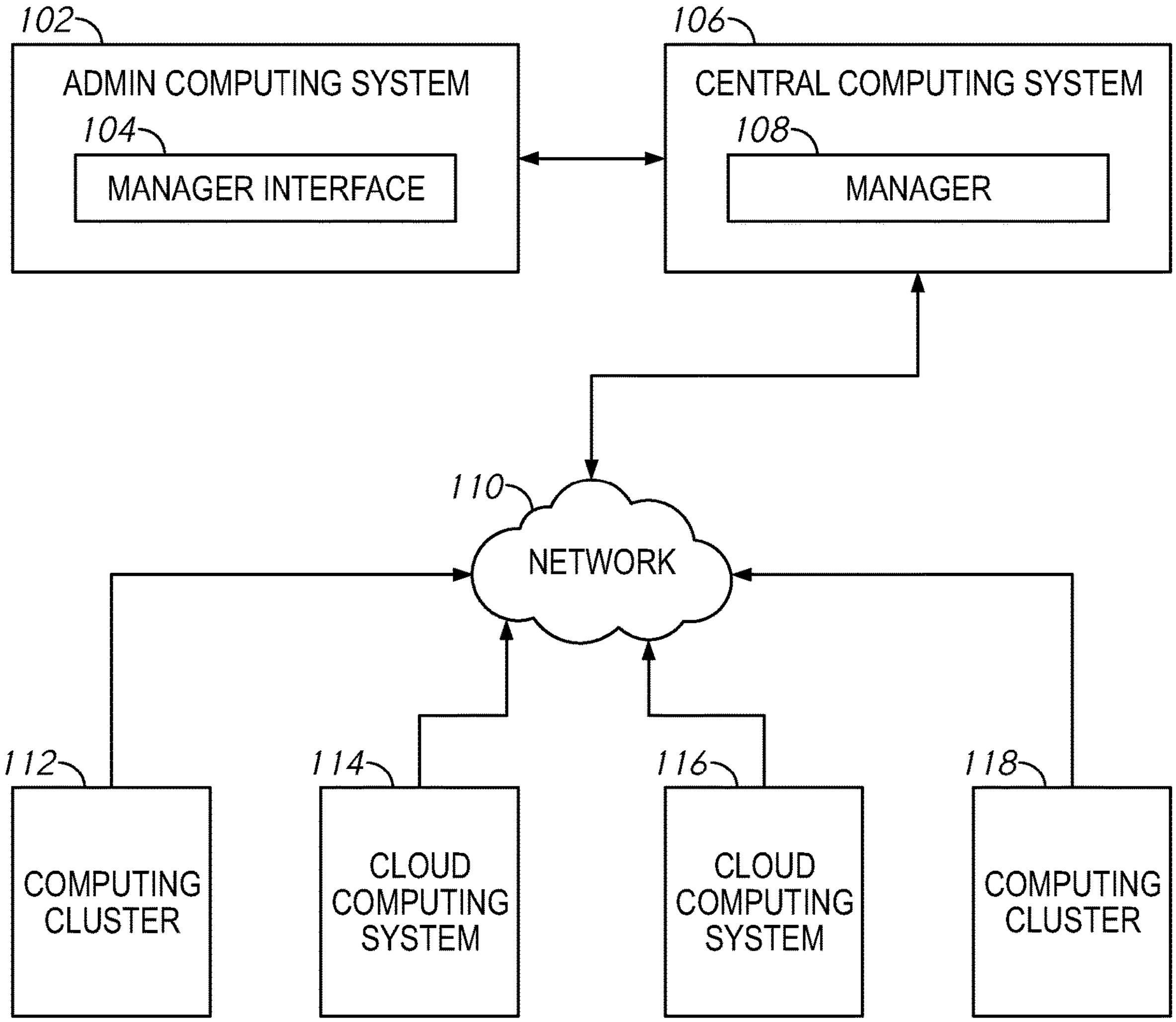
FIG. 1 is a block diagram of a multi-cloud computing system, in accordance with embodiments of the present disclosure.

Examples described herein may profile a workload and predict behavior of the workload on a target computing environment with, in some examples, a target instance type. In some examples, the behavior may be predicted based on one or more key performance indicators for the workload, which key performance indicators may be provided and/or specified by a user. For example, methods may use function approximation to model a relationship between one or more of an application's key performance indicators and the underlying infrastructure or architecture of the computing environment. Methods may use transfer learning to determine how the workload may behave or execute in other computing environments with different instance types or architectures. This transfer learning may be advantageous for example when predicting execution behavior in different architectures. For example, one architecture might be a hyperconverged system where input/output (I/O) is collocated with compute resources (e.g., processors), such that data proximity is important to performance. Another architecture may be a three-tier system, where data is retrieved over a network, so data locality does not affect performance in the same manner. These differences may make it challenging to predict how the workload executing at a hyperconverged architecture may execute at a three-tier architecture. Further, methods may use exploration and exploitation techniques to converge on a recommended or suggested instance configuration size.

Various embodiments of the present disclosure may provide methods to detect candidate cloud instances for relocation (such as virtual machines or container workload instances) automatically. Candidate cloud instances may include inefficient cloud instances which may generally refer to instances of processes which are operating below a threshold level of performance. Various methods may use machine learning to find an optimal environment for the candidate instance based on the workload, minimum acceptable performance, cost minimization, and/or other parameters. For example, methods may fingerprint a workload to provide a fingerprint indicative of particular characteristics of the workload. The fingerprint may be used to select a computing environment and/or instance type based on a model for right sizing the instance. The model may be generated, for example, using a database of performance metrics for various real world workloads executing in various computing environments. For example, a machine learning model may be trained based on data from workloads executing in various computing environments. In this manner, the machine learning model may be used to predict the performance of a particular workload in a particular computing environment. In some implementations, a user may set minimum acceptable performance parameters that may be taken into account when determining a location for a particular workload and/or an optimal instance type.

Various methods described herein may also provide for automatic right sizing of instances. For example, once a recommendation is obtained, a new instance (e.g., virtual machine and/or container) for the workload may be deployed based on the recommendation. The recommendation may take into account multiple instance types across candidate computing environments and architectures. For example, if a workload at a first cloud environment is very costly, the methods may suggest a similar instance on a second, less expensive, cloud environment.

Examples of systems and methods described herein may allow users to utilize available cloud resources and ensure workloads run smoothly by bursting instances of the workload to the cloud using spot instances. For example, a method may profile a workload and its key performance indicators and use game theory to burst instances of the workload to the cloud using spot instances. The profile may include whether a workload is stateful or stateless. Example methods may utilize a profile to identify resource requirements and predict surges in demand based on, for example, past demand patterns captured in the profile. If current instances of the workload do not have enough capacity, the method may determine a bid price to obtain additional spot instances at cloud computing platforms to provide additional capacity. The bid price may be determined using game theory. The system may also include a networking domain spanning the various computing platforms over a transit gateway and a program load balancer.

Various embodiments of the present disclosure will be explained below in detail with reference to the accompanying drawings. Other embodiments may be utilized, and structural, logical and electrical changes may be made without departing from the scope of the present disclosure. FIG. 1 is a block diagram of a multi-cloud platform as a service system 100, in accordance with an embodiment of the present disclosure. The system may include one or more of any of computing cluster 112, cloud computing system 114, cloud computing system 116, and computing cluster 118. Each of the computing clusters and cloud computing systems may be coupled to respective data sources. The system may further include a central computing system 106 coupled to one or more of the computing cluster 112, cloud computing system 114, cloud computing system 116, and/or computing cluster 118, via a network 110 to manage communication within the system. While particular computing clusters and cloud computing systems are shown in FIG. 1, additional, fewer, and/or different clusters and/or systems may be present in other examples.

The network 110 may include any type of network capable of routing data transmissions from one network device (e.g., of the computing clusters 112, the central computing system 106, and/or the cloud computing system 114) to another. For example, the network 110 may include a local area network (LAN), wide area network (WAN), intranet, or a combination thereof. The network 110 may include a wired network, a wireless network, or a combination thereof.

Each of the computing clusters 112 may be hosted on a respective computing cluster platform having multiple computing nodes (e.g., each with one or more processors, volatile and/or non-volatile memory, communication or networking hardware, input/output devices, or any combination thereof) and may be configured to host additional resources, such as virtual machines (VMs), platform as a service (PaaS) software stacks, containers, virtualization managers and/or other resources. Each of the cloud computing systems 114 may be hosted on a respective public or private cloud computing platform (e.g., each including one or more data centers with a plurality of computing nodes or servers having processor(s), volatile and/or non-volatile memory, communication or networking hardware, input/output devices, or any combination thereof) and may be configured to host respective virtual machines, containers, virtualization managers, software stacks, or other various types of software components. Examples of computing platforms may include any one or more of a computing cluster platform, a bare metal system platform, or a cloud computing platform. Examples of service domains may be instantiated on any of the computing clusters 112 or 118 or the cloud computing systems 114 and 116. Software located at any of the computing platforms may include instructions that are stored on a computer readable medium (e.g., memory, storage, disks, etc.) that are executable by one or more processors (e.g., central processor units (CPUs), graphic processor units (GPUs), tensor processing units (TPUs), hardware accelerators, video processing units (VPUs), etc.) to perform functions, methods, etc., described herein.

The manager 108 hosted on the central computing system 106 may centrally manage the computing platforms, including monitoring virtual machines, containers, and workloads executing at the computing platforms. For example, the manager 108 may monitor or receive information about resource usage of various workload instances (which may be, for example, virtual machines or containers). The manager 108 may also, in some implementations, configure instances of workloads, create new instances of workloads, or consolidate instances of workloads based on the resource usage of the workloads. Such actions may be taken in response to a request from a user, after consent from a user, or automatically based on user settings. Users may include individuals (e.g., system administrators, consumers, customers), enterprises, and/or other processes or instances. The central computing system 106 may include one or more computing nodes configured to host the manager 108. The central computing system 106 may include a cloud computing system and the manager 108 may be hosted in the cloud computing system and/or may be delivered/distributed using a software as a service (SaaS) model, in some examples. In some examples, the manager 108 may be distributed across a cluster of nodes of the central computing system 106.

In some examples, an administrative computing system 102 may host a manager interface 104. The manager interface 104 may facilitate user or customer communication with the manager 108 to control operation of the manager 108. The manager interface 104 may include a graphical user interface (GUI), APIs, command line tools, etc., that each may facilitate interaction between one or more users and the manager 108. The manager interface 104 may provide an interface that allows a user to monitor and configure virtual machines, containers, and/or workloads at each of the computing platforms managed by the manager 108. The manager interface 104 may also provide a view of all instances at computing platforms managed by the manager 108, regardless of the vendor, architecture, or other differences associated with the computing platforms. The manager interface 104 may also allow a user to select preferences for right sizing of workload instances across computing platforms, specify performance criteria for specific workloads, and respond to requests from the manager 108 regarding recommended resource provisions for various workloads.

In various implementations, the system shown in FIG. 1 may include additional and/or different computing platforms, different types of computing platforms, and/or different architectures. Each computing platform may be described as a computing environment. Each computing environment may have an architecture, such as a three-tier architecture, clustered architecture, hyperconverged clustered architecture, and/or other architectures. The manager 108 may monitor how workloads execute at various computing environments and may determine how a workload may execute in a different architecture. For example, the manager 108 may monitor a workload at a hyperconverged on-premises clustered computing environment. Monitoring a workload may include monitoring compute usage (e.g., CPU usage), memory usage, latency, speed, health (e.g., operational or not operational), demand (e.g., frequency of requests), and/or other parameters. If a user requests to migrate the workload or create a spot instance of the workload at a cloud computing environment, which may have, for example, a three-tier architecture, the manager 108 may predict how the workload will execute at the cloud computing environment and suggest configurations of the instance to, for example, save money, meet performance requirements, and/or use available reserved instances at a cloud computing platform. The manager 108 may also recommend a cloud computing platform from several candidate computing platforms. The manager 108 may make such recommendations responsive to user request and/or responsive to determination that the performance of the workload has fallen below a threshold and/or that performance improvement may be expected by movement to a different environment. In various implementations, the manager 108 may use a neural network or other computational model created from monitoring workloads executing at the various computing environments to determine how the workload may execute at different computing environments with different architectures and provisions of computing resources. For example, a neural network may be trained using known operations of workloads in known computing environments to predict the performance of a new workload in a particular computing environment. The manager 108 may accordingly include and/or utilize a trained neural network.

Figure 2:
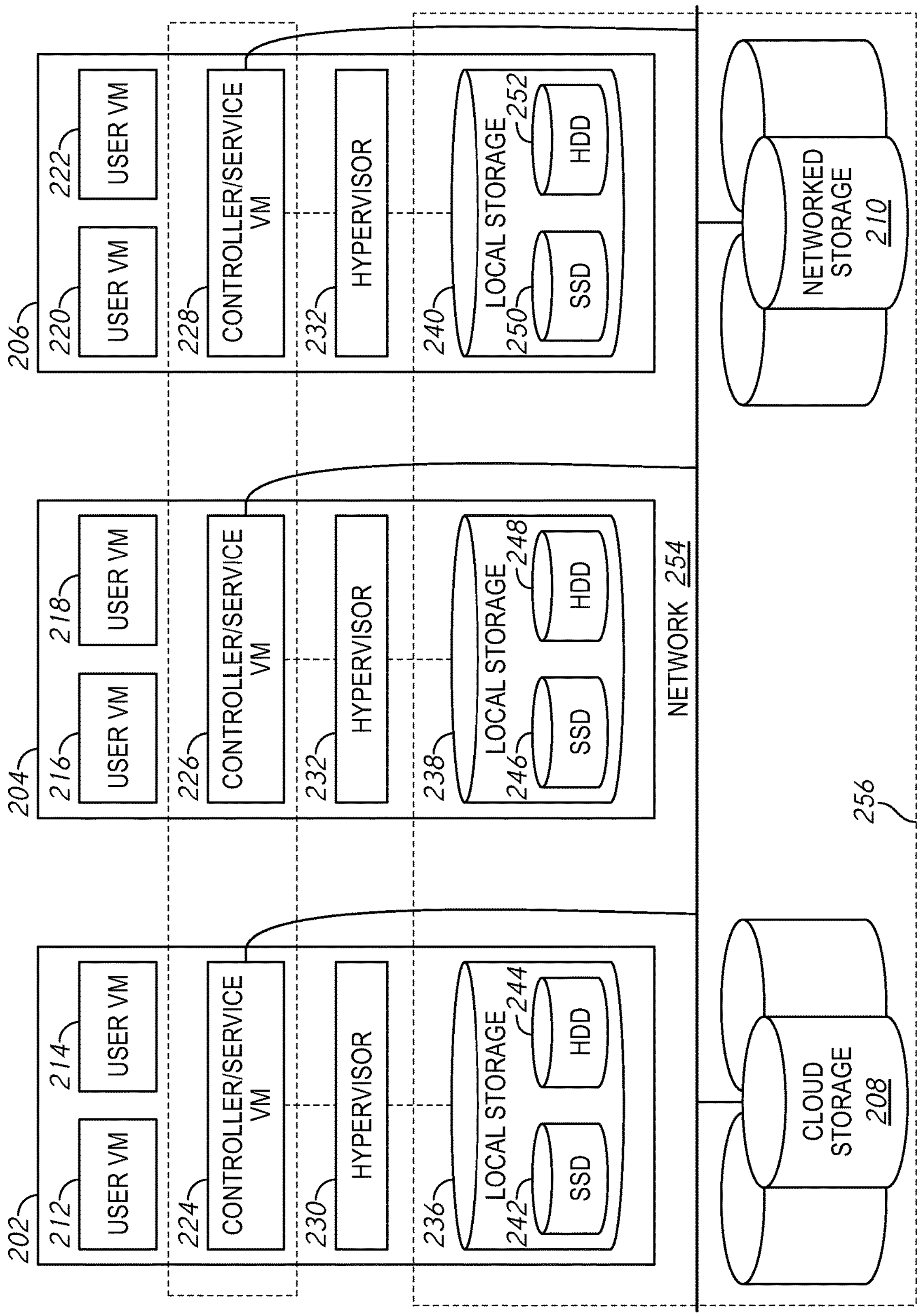
FIG. 2 illustrates a clustered virtualization environment in accordance with embodiments of the present disclosure.

FIG. 2 illustrates a clustered virtualization environment 200 according to particular embodiments. The clustered virtualization environment 200 may be implemented, for example, at the computing cluster 112, the computing cluster 118, or other computing platforms that may be included in the system. The clustered virtualization environment 200 includes user virtual machines (VMs) 212-222 executing on host machines 202, 204, and 206. The user VMs may be workloads executing at the clustered virtualization environment and monitored by the manager 108 of the central computing system 108. Further, the clustered virtualization environment 200 shows an example of a hyperconverged architecture, where the host machines 202, 204, and 206 each access a storage pool including, in part, local storage of each of the respective host machines 202, 204, and 206.

The architectures of FIG. 2 can be implemented for a distributed platform that contains multiple host machines 202, 206, and 204 that manage multiple categories of storage. The multiple categories of storage may include storage that is accessible through network 254, such as, by way of example and not limitation, cloud storage 208 (e.g., which may be accessible through the Internet), network-attached storage 210 (NAS) (e.g., which may be accessible through a LAN), or a storage area network (SAN). The present embodiment also permits local storage 236, 238, and 240 that is incorporated into or directly attached to the host machine and/or appliance to be managed as part of storage pool 256. Examples of such local storage include Solid State Drives 242, 246, and 250 (henceforth "SSDs"), Hard Disk Drives 244, 248, and 252 (henceforth "HDDs" or "spindle drives"), optical disk drives, external drives (e.g., a storage device connected to a host machine via a native drive interface or a serial attached SCSI interface), or any other direct-attached storage. These storage devices, both direct-attached and network-accessible, collectively form storage pool 256. Virtual disks (or "vDisks") may be structured from the physical storage devices in storage pool 256. As used herein, the term vDisk refers to the storage abstraction that is exposed by a hypervisor and/or a Controller/Service VM (CVM) (e.g., 224) to be used by a user VM (e.g., 212). In particular embodiments, the vDisk may be exposed via iSCSI ("internet small computer system interface") or NFS ("network filesystem") and is mounted as a virtual disk on the user VM. In particular embodiments, vDisks may be organized into one or more volume groups (VGs).

Each host machine 202, 206, 204 may run virtualization software, such as VMWARE ESX(I), MICROSOFT HYPER-V, or REDHAT KVM. The virtualization software includes 230, 232, and 234 to create, manage, and destroy user VMs, as well as managing the interactions between the underlying hardware and user VMs. User VMs may run one or more applications that may operate as "clients" with respect to other elements within clustered virtualization environment 200. Though not depicted in FIG. 2, a hypervisor may connect to network 254. In particular embodiments, a host machine 202, 206, or 204 may be a physical hardware computing device; in particular embodiments, a host machine 202, 206, or 204 may be a virtual machine.

CVMs 224, 226, and 228 may be used in some examples to manage storage and input/output ("I/O") activities according to particular embodiments. These controller VMs may act as the storage controller in the currently described architecture. Multiple such storage controllers may coordinate within a cluster to form a unified storage controller system. CVMs may run as virtual machines on the various host machines, and work together to form a distributed system that manages all the storage resources, including local storage, network-attached storage 210, and cloud storage 208. The CVMs may connect to network 254 directly, or via a hypervisor. Since the CVMs run independent of hypervisors 230, 232, 234, this means that the current approach can be used and implemented within any virtual machine architecture, since the CVMs of particular embodiments can be used in conjunction with any hypervisor from any virtualization vendor. In some examples, however, CVMs may not be used, and the hypervisors may perform the functions attributed to the CVMs.

A host machine may be designated as a leader node within a cluster of host machines. For example, host machine 204, as indicated by the asterisks, may be a leader node. A leader node may have a software component designated to perform operations of the leader. For example, CVM 226 on host machine 204 may be designated to perform such operations. A leader may be responsible for monitoring or handling requests from other host machines or software components on other host machines throughout the virtualized environment. If a leader fails, a new leader may be designated. In particular embodiments, a management module (e.g., in the form of an agent) may be running on the leader node.

Each CVM 224, 226, and 228 may export one or more block devices or NFS server targets that appear as disks to user VMs 212, 214, 216, 218, 220, and 222. These disks are virtual, since they are implemented by the software running inside CVMs 224, 226, and 228. Thus, to user VMs, CVMs appear to be exporting a clustered storage appliance that contains some disks. User data (including the operating system) in the user VMs may reside on these virtual disks.

Significant performance advantages can be gained by allowing the virtualization system to access and utilize local storage 236, 238, and 240 as disclosed herein. This is because I/O performance is typically much faster when performing access to local storage as compared to performing access to network-attached storage 210 across a network 254. This faster performance for locally attached storage can be increased even further by using certain types of optimized local storage devices, such as SSDs. Accordingly, the manager 108 may suggest instantiation of, or automatically instantiate, instances of workloads that heavily utilize data at local storage 236, 238, and 240 at the hyperconverged cluster 200. Workloads instantiated at the hyperconverged cluster 200 may be, in various examples, user VMs, containers, or other abstractions providing access to resources of the hyperconverged cluster 200.

Figure 3:
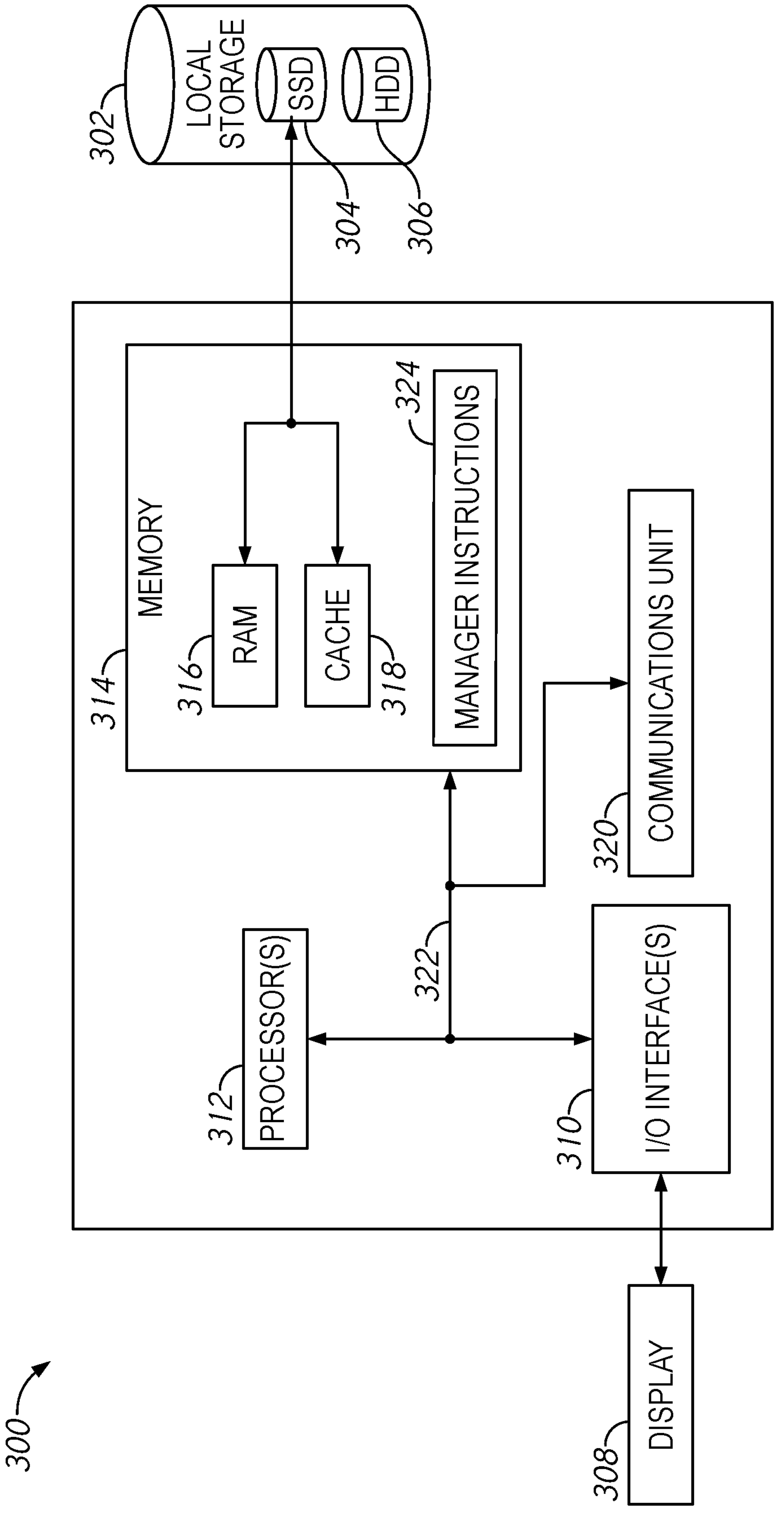
FIG. 3 is a block diagram of components of a computing node in accordance with embodiments of the present disclosure.

FIG. 3 is a block diagram of a computing node 300, in accordance with an embodiment of the present disclosure. The computing node 300 is shown implementing the central computing system 106. In various implementations, the computing node 300 or similar computing nodes may be implemented as part of a cluster of computing nodes forming the computing cluster, the bare metal computing platform, or the cloud computing platform described with reference to FIG. 1 configured to host the described service domains.

The computing node 300 includes a communications fabric 322, which provides communication between one or more processor(s) 312, memory 314, local storage 302, communications unit 320, and/O interface(s) 310. The communications fabric 322 can be implemented with any architecture designed for passing data and/or control information between processors (such as microprocessors, communications and network processors, etc.), system memory, peripheral devices, and any other hardware components within a system. For example, the communications fabric 322 can be implemented with one or more buses.

The memory 314 and the local storage 302 are computer-readable storage media. In this embodiment, the memory 314 includes random access memory RAM 316 and cache 318. In general, the memory 314 can include any suitable volatile or non-volatile computer-readable storage media. In an embodiment, the local storage 302 includes an SSD 304 and an HDD 306. The memory 314 may hold computer readable instructions, files, data, etc., for execution by one or more of the processors 312 of the computing node 300. For example, the memory 314 includes manager instructions 324 which, when executed by the processors 312 implement the manger 108 of the central computing system 106. Where the computing node 300 is implemented as a node in a computing platform or cluster monitored by the central computing system 106, the memory 314 may hold computer readable instructions for workloads instantiated at the respective computing platform by the manager 108.

Various computer instructions, programs, files, images, etc., may be stored in local storage 302 for execution by one or more of the respective processor(s) 312 via one or more memories of memory 314. In some examples, local storage 302 includes a magnetic HDD 306. Alternatively, or in addition to a magnetic hard disk drive, local storage 302 can include the SSD 304, a semiconductor storage device, a read-only memory (ROM), an erasable programmable read-only memory (EPROM), a flash memory, or any other computer-readable storage media that is capable of storing program instructions or digital information.

The media used by local storage 302 may also be removable. For example, a removable hard drive may be used for local storage 302. Other examples include optical and magnetic disks, thumb drives, and smart cards that are inserted into a drive for transfer onto another computer-readable storage medium that is also part of local storage 302.

Communications unit 320, in some examples, provides for communications with other data processing systems or devices. In these examples, communications unit 320 includes one or more network interface cards. Communications unit 320 may provide communications through the use of either or both physical and wireless communications links. For example, the communications unit 320 may provide connection to the network 110, allowing for communication with the admin computing system, the service domains managed by the manager 108, and other locations.

I/O interface(s) 310 allow for input and output of data with other devices that may be connected to a computing node 300. For example, I/O interface(s) 310 may provide a connection to external devices such as a keyboard, a keypad, a touch screen, and/or some other suitable input device. External devices can also include portable computer-readable storage media such as, for example, thumb drives, portable optical or magnetic disks, and memory cards. Software and data used to practice embodiments of the present disclosure can be stored on such portable computer-readable storage media and can be loaded onto local storage 302 via I/O interface(s) 310. I/O interface(s) 310 may also connect to a display 308.

Display 308 provides a mechanism to display data to a user a may be, for example, a computer monitor. In some examples, a GUI associated with the Manager interface 104 may be presented on the display 308.

While not shown, in some examples, computing node(s), such as computing node 300 may be configured to execute a hypervisor, a controller virtual machine (VM) and one or more user VMs. The user VMs may be virtual machine instances executing on the computing node 300. The user VMs may share a virtualized pool of physical computing resources such as physical processors (e.g., hardware accelerators) and storage (e.g., local storage, cloud storage, and the like). The user VMs may each have their own operating system, such as Windows or Linux. Generally any number of user VMs may be implemented. User VMs may generally be provided to execute any number of applications which may be desired by a user and may be workloads instantiated and managed by the manager 108 of the central computing system 106. The computing node 300 may also be configured to execute containers or other abstractions as workloads managed by the manager 108.

Figure 4:
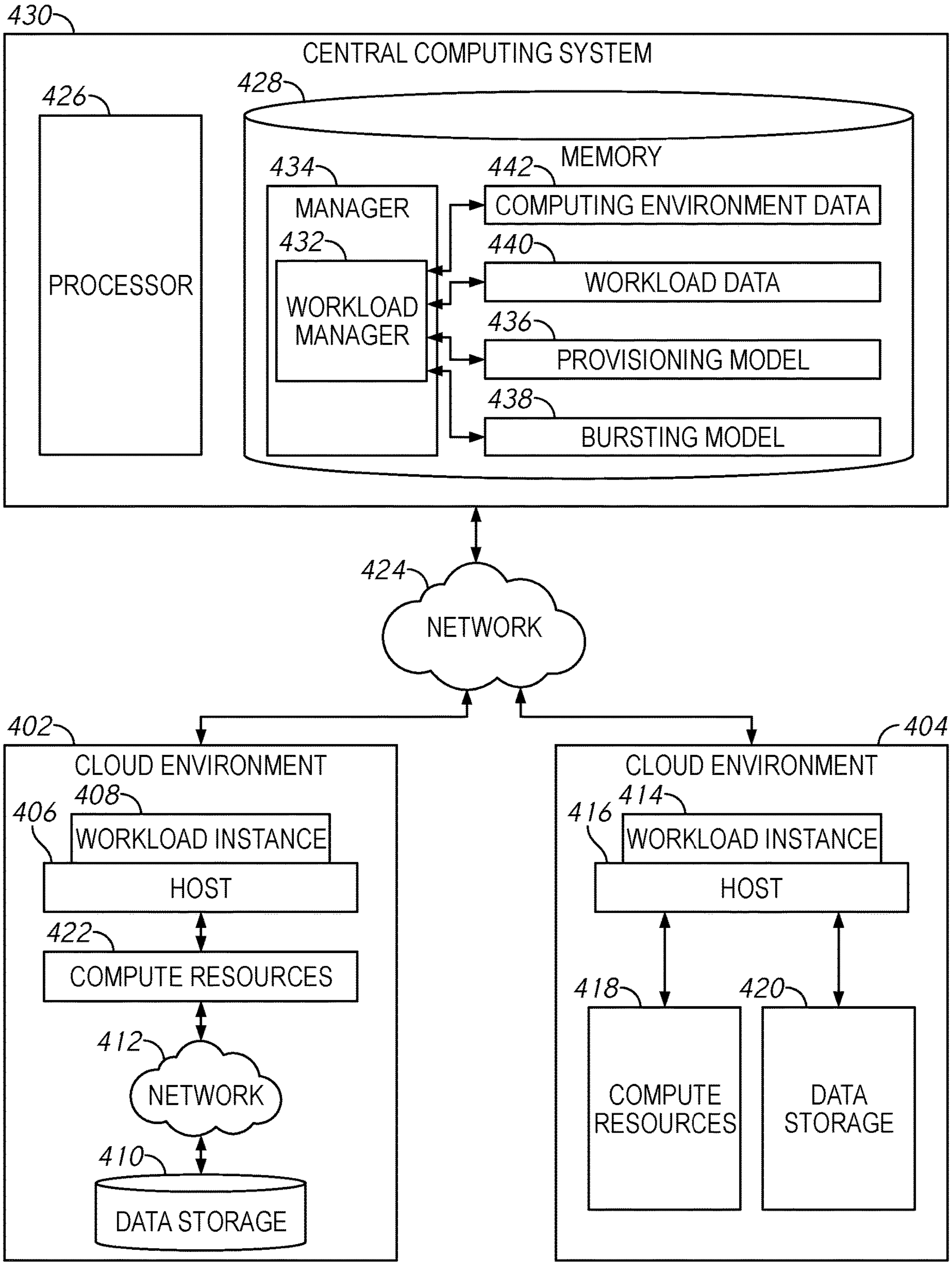
FIG. 4 illustrates a central computing system in communication with cloud environments in accordance with embodiments on the present disclosure.

FIG. 4 shows an example central computing system 430 in communication with a cloud environment 402 and a cloud environment 404 over a network 424. The cloud environment 402 and the cloud environment 404 may be cloud computing systems, such as cloud computing systems 114 and 116 of FIG. 1. The central computing system 430 may correspond to the central computing system 106 of FIG. 1, while the manager 434 may correspond to the manager 108 of FIG. 1. The manager 434 may include a workload manager 432. The workload manager 432 may monitor various workloads executing across the cloud environments in communication with the workload manager 432 and may manage existing instances, create new instances, and/or perform other actions to allocate an appropriate amount of computing resources to an application with instances of the application provided as workloads to the cloud environments. Though the workload manager 432 is shown in communication with two cloud environments, in various implementations, the workload manager 432 may communicate with additional cloud environments and/or other types of service domains (e.g., computing clusters, bare metal service domains, etc.).

The central computing system 430 may be any type of computing device including one or more processors 426 and memory 428, and may be implemented using any of the devices or methods discussed with respect to the central computing system 106. For example, the central computing system 430 may be implemented by the computing node 300. The memory 428 may store instructions which, when executed by the processors 426 implement the manager 434, including the workload manager 432. The memory 428 may further store various models and data used and/or created (e.g., trained) by the workload manager 432, such as a provisioning model 436, bursting model 438, workload data 440, and computing environment data 442. In some implementations, the data and models may be stored at another storage location local to the central computing system 430 or otherwise accessible by the central computing system 430.

The workload manager 432 may monitor and configure workloads managed by the workload manager 432 in various computing environments. In some examples, the workload manager 432 may provide a suggested or recommended instance for a workload in a specific computing environment based on performance indicators of the workload, which performance indicators may be generated based on execution of the workload at a second computing environment. A suggested instance may include a suggested resource allocation (e.g., size of the workload) in the computing environment to meet performance standards for the workload while reducing inefficient use of computing resources.

The workload manager 432 may also continually monitor multiple workloads at multiple computing environments to identify workloads that may be overprovisioned (e.g., allocated more computing resources than used), underprovisioned (e.g., not allocated enough computing resources to maintain desired performance), or constrained. The workload manager 432 may, in some implementations, automatically resize workloads that are overprovisioned or underprovisioned and may create additional instances of workloads based on the workload's demand patterns. The workload manager 432 may also act as a load balancer, ensuring that workloads and/or individual instances of workloads are distributed across available computing environments. For example, the workload manager 432 may identify workloads which may execute more efficiently in an alternate computing environment. The workload manager 432 may leverage computing environment data 442, workload data 440, the bursting model 438, and the provisioning model 436 to monitor workloads, suggest instances of workloads in specific computing environments, resize workloads, create new instances of workloads, and perform other functions.

The computing environment data 442 may include various information about the computing environments managed by the manager 434, including the cloud environment 402 and the cloud environment 404. A computing environment may be managed by the manager 434 where the manager 434 is in communication with the computing environment and has the ability to create and configure instances of workloads at the computing environment. The manager 434 may manage a portion of a computing environment, such as managing reserved instances in a public cloud environment. In various embodiments, data stored as computing environment data 442 may include total compute resources available, total compute resources utilized, number and type of reserved instances at the computing environment, price to obtain a spot instance at the computing environment, fingerprints of workloads executing at the computing environment, architecture of the computing environment, security features of the computing environment, available configurations for virtual machines in the computing environment, and available configurations for containers in the computing environment, among other data. The computing environment data 442 may include data for computing environments available for use by the manager 434, even where no workloads managed by the workload manager 432 are actively running at the computing environment. Such data may be stored using various types of data structures and may be distributed across multiple physical memory or storage locations of the central computing system 430 or storage locations accessible by the central computing system 430.

The workload data 440 may include various information about the workloads of applications managed by the workload manager 432. For example, workload data 440 may include characteristics of the workload (e.g., whether the workload is stateful or stateless), demand patterns of the workload, a fingerprint of the workload, performance indicators of the workload in various computing environments, location of data used by the workload, security or privacy parameters, existing instances of the workload, available configurations of the workload (e.g., container or VM), etc. The workload data 440 may include data for workloads executing in the computing environments managed by the manager 434 and other workloads managed by the workload manager 432. In some implementations, the workload data 440 may include data for workloads not managed by the workload manager 432 that may be used by the workload manager 432, for example, in generating models or otherwise providing comparison to workloads managed by the workload manager 432. The workload data 440 may be stored using various types of data structures and may be distributed across multiple physical memory or storage locations of the central computing system 430.

The workload manager 432 may provide performance indicators of a workload in a first computing environment (e.g., a hyperconverged infrastructure environment) to the provisioning model 436, receiving one or more suggested instances for the workload from the provisioning model 436 (e.g., a suggestion to move the workload from the hyperconverged infrastructure environment to a 3-tier architecture environment). For example, the workload manager 432 may provide current resource allocation, I/O request volume, and/or workload execution speed at the first computing environment to the provisioning model 436. The provisioning model 436 may be a trained neural network that may take performance indicators of a workload in one architecture as input and output expected performance indicators of the workload in another environment. The manager 434 may accordingly identify another configuration for the workload based on the expected performance indicators for the workload in other environments. The workload manager 432 may receive suggested instance configurations for the workload at the first computing environment and/or additional computing environments, including computing environments with different underlying architecture than the first computing environment. In some implementations, the workload manager 432 may provide a target second computing environment to the provisioning model 436, such that the workload manager 432 receives suggested instances for the workload at the second computing environment as output from the provisioning model 436.

The provisioning model 436 may be implemented using various machine learning, artificial intelligence, or other models, including various combinations of models. In various implementations, the provisioning model 436 may include a classifier using an algorithm, such as a k nearest neighbors (kNN) algorithm or clustering to classify a workload whose performance indicators are provided as input to the provisioning model 436. Classifiers of the provisioning model 436 may be trained using the workload data 440 and/or datasets about other workloads and their respective execution environments. Classifiers of the provisioning model 436 may, in some implementations, be used to identify similar workloads or a type of the workload (e.g., stateful or stateless), which may be used by the workload manager 432 to suggest a configuration for an instance of the workload at one or more computing environments.

In various implementations, the provisioning model 436 may include a neural network trained using the workload data 440. A neural network of the provisioning model may receive performance indicators as input and provide a suggested instance of the workload as output (e.g. a suggested computing environment and/or configuration for the workload based on expected performance of the workload in that environment and/or configuration). In some instances, neural networks of the provisioning model 436 may generate a fingerprint for a workload based on the workload data 440, where the fingerprint forms a representation of the workload used for comparison to other workloads. Such fingerprints may be provided to the workload manager 432, stored with the workload data 440, or used by other models of the provisioning model 436 as input. The fingerprint may be used by the neural network that generated the fingerprint to, for example, identify other workloads with similar fingerprints, where data about the similar workloads may be used to suggest an instance for the workload.

The provisioning model 436 may include one model providing suggested instances for various computing environments managed by the manager 434 and/or individual models for individual computing environments or architecture types for computing environments managed by the manager 434. For example, the provisioning model 436 may include a model specific to a computing environment, which may be utilized to provide a suggested instance in that particular computing environment. The provisioning model 436 may include a model including multiple computing environments to identify a suitable computing environment for a workload and to provide a suggested configuration for an instance of the workload at the identified computing environment. In some implementations, the workload manager 432 may use multiple models of the provisioning model 436, each configured to provide suggested configurations for one computing environment, to provide multiple suggested instances at multiple computing environments.

The workload manager 432 may provide application information (e.g., performance indicators for each workload or instance of an application, demand patterns of the application, and/or additional information) to the bursting model 438 to obtain suggested configurations for spot instances of workloads of the application. An application may include multiple workloads, and each workload may be performed by one or more instances of the workload (e.g., individual virtual machines or containers executing at various computing environments). As demand for applications may vary, some workloads may benefit from spot instances, which may be additional instances of the workload deployed temporarily to compensate for additional demand. For example, a workload receiving user requests to be processed by other workloads of an application may use spot instances at high traffic times of day. The workload manager 432 may utilize the bursting model to identify workloads that may benefit from spot instances and to provide configurations for suggested spot instances.

In various implementations, the bursting model 438 may be trained using the computing environment data 442 (e.g., spot instance costs and available instance types) and the workload data 440 (e.g., performance indicators and demand data) to suggest and/or create temporary or spot instances of a workload, which may be referred to as "bursting" a workload. The bursting model 438 may use game theory, reinforcement learning, imitation learning or other methods to suggest, bid for, and/or create spot instances. For example, the workload manager 432 may provide application demand or usage patterns, performance indicators for instances of the application, and configuration of workloads included in the application to the bursting model 438. The bursting model 438 may then identify a workload that may benefit from a spot instance based on the demand pattern of the application. For example, a workload where instances are underprovisioned or close to underprovisioned at high demand times but underprovisioned at low demand times may benefit from one or more spot instances. The bursting model 438 may then recommend a spot instance for the workload to the workload manager 432. In some implementations, the bursting model 438 may select a recommended spot instance from pre-configured reserved instances available to the workload manager 432. The bursting model 438 may use similar processes as those described with respect to the provisioning model 436 to provide a suggested instance for a workload based on workload performance indicators. The bursting model 438 may, in various implementations, provide performance indicators to the provisioning model 436 along with additional information (e.g., a constraint to return only spot instances) and may receive suggested spot instances from the provisioning model 436 for communication to the workload manager 432.

Though the cloud environment 402 and cloud environment 404 are shown in FIG. 4, the central computing system 430 may communicate or connect with additional cloud environments and/or other computing environments. Additional cloud environments and computing environments may include various architectures including, clustered systems, three-tiered systems, converged systems, hyperconverged systems, etc. Further, the various computing environments, including cloud environments, may be provided by different vendors or have different security and access features (e.g., a private cloud or a public or shared cloud).

Workload instances (e.g., workload instances 408 and 414) generally execute at a host machine through a host interface to access computing resources (e.g., memory and processing) of the host machine and/or computing resources available to the host machine, such as processors of other computing nodes in a cluster of computing nodes or processors or a cloud computing environment. For example, workload instances may be configured as virtual machines running on a hypervisor acting as a host or as containers running on a docker acting a host. The workload instance may access compute resources to execute tasks of the workload instance, which may be processors or other compute elements accessible by the host machine. Some workloads may also access data storage (e.g., persistent data storage) to store data persisting across requests to the workload.

The cloud environment 402 is shown having a tiered architecture, where a workload instance 408 runs on a host 406 with access to compute resources 422. Data (e.g., pipeline data) is stored at data storage 410, which is accessible to the compute resources 422 via a network 412. The workload instance 408 may be configured as a virtual machine, a container, or other abstraction providing allocation of computing resources in the cloud environment 402. The cloud environment 404 is shown having a hyperconverged architecture, where a workload instance 414 runs on a host 416 with access to co-located compute resources 418 (e.g., processors executing tasks of the workload instance 414) and data storage 420. As in the cloud environment 402, the workload instance 414 may be configured as a virtual machine, a container, or other abstraction providing allocation of computing resources in the cloud environment 404. Where the workload instance 414 is a virtual machine, the host 416 is a hypervisor providing access to the compute resources 418 and the data storage 420. Where the workload instance 414 is a container, the host 416 is a docker engine providing access to the compute resources 418 and the data storage 420 of the cloud environment 404.

Some workloads may access data from data storage during execution (e.g., for data analysis) or use backing data to store a state of the application or data between requests to the workload or application. These workloads may be referred to as stateful workloads. A stateful workload may execute more efficiently (e.g., process a request more quickly or with fewer steps) in a hyperconverged architecture than in a tiered architecture because the host 406 of the tiered architecture does not provide direct access to data storage 410 by the workload instance 408 executing on the host 406 and a call over a network 412 is used to access data storage 410. The provisioning model 436 and the bursting model 438 may be configured (e.g., trained) to account for these differences when suggesting instances for workloads and may, in some implementations, classify workloads as stateful or stateless based on the performance indicators of the workload. The classification of a workload as stateful or stateless may be used to select a computing environment where one is not pre-selected for the workload.

Figure 5:
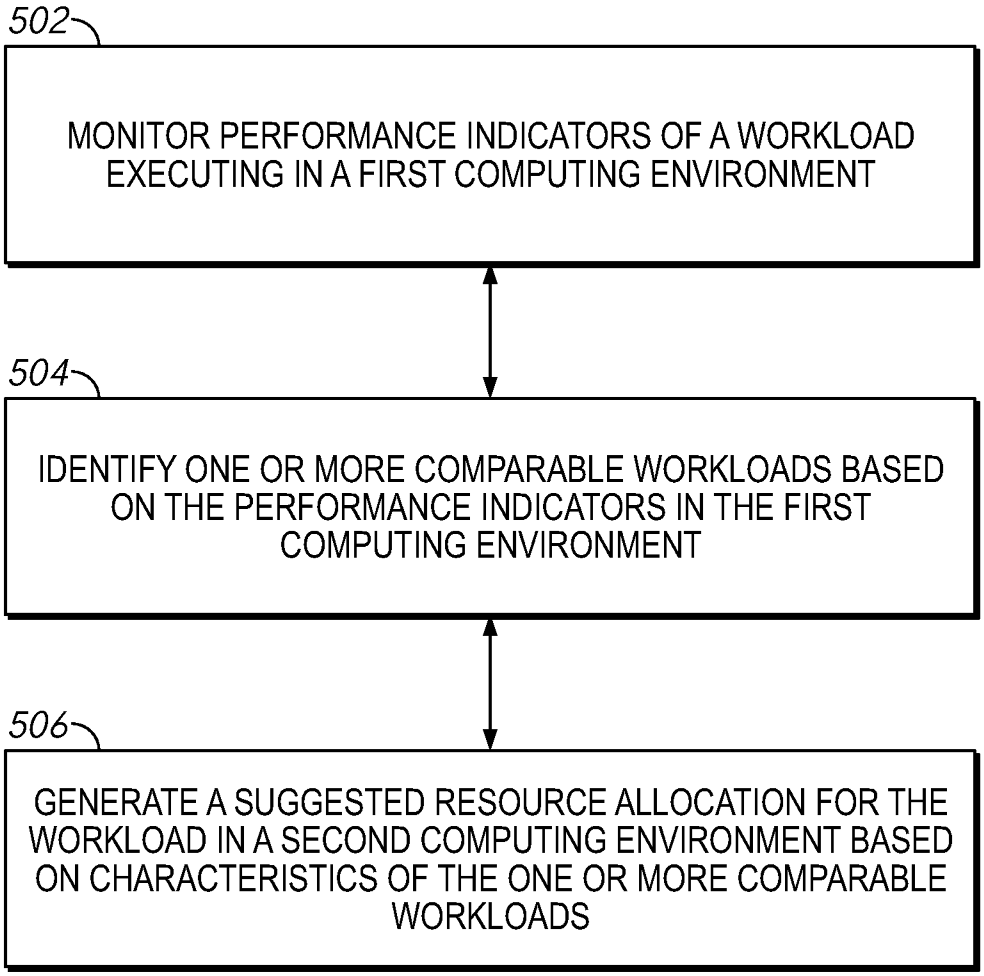
FIG. 5 shows a flow chart for generating a suggested resource allocation for a workload transferring from a first architecture to a second architecture in accordance with embodiments of the present disclosure.

FIG. 5 shows a flow chart of a method for generating a suggested resource allocation of a workload. The suggested resource allocation may be generated by the workload manager 432 in response to a request to move the workload from a first computing environment to a second computing environment or to create an additional instance of a workload executing at a first computing environment at a second computing environment. For example, an administrative user may request to move a workload from a first computing environment to a second computing environment where an instance in the second computing environment may be less expensive or where an enterprise has added or changed computing resources available for the execution of workloads. The workload manager 432 may also generate the suggested resource allocation as part of the process of monitoring and right-sizing workloads managed by the workload manager 432.

At block 502 the workload manager 432 monitors performance indicators of a workload executing in a first computing environment. Performance indicators may include, for example, processor usage, number or volume of I/O requests, classification of the workload as stateful or stateless, runtime, memory usage, usage and demand patterns, and/or other performance measurements. In some implementations, the computing environments monitored by the manager 434 may automatically transmit performance indicators for workloads managed by the workload manager 432 to the workload manager 432 at specified time intervals (e.g., every hour, every five minutes, etc.). In some implementations, the workload manager 432 may transmit a request for performance indicators of a workload or multiple workloads as needed or at specified time intervals.

When the workload manager 432 receives the performance indicators, the workload manager 432 may update the workload data 440, the computing environment data 442, the provisioning model 436, and/or the bursting model 438 to include the performance indicators. In some implementations, the workload manager 432 may update the workload data 440 using the performance indicators. For example, the performance indicators may be added to the structures of the workload data 440 and the computing environment data 442, which may be used, in some situations to re-train the provisioning model 436 and/or the bursting model 438 or to train new models for use by the workload manager 432. The performance indicators, or a subset of the performance indicators, may also be provided to the provisioning model 436 and/or the bursting model 438 in a feedback loop to improve performance of the provisioning model 436 and the bursting model 438. For example, the performance indicators may be provided to the provisioning model through a feedback loop where the provisioning model generated the configuration for the instance of the workload in the first computing environment to improve recommendations produced by the provisioning model 436.

The workload manager 432 may identify the workload as overprovisioned, underprovisioned, or constrained. Based on the identification, the workload manager 432 may provide the performance indicators of the workload to the provisioning model 436 and/or the bursting model 438 to identify additional or alternative instances of the workload to right-size the workload. The workload manager 432 may also provide the performance indicators to the provisioning model based on a user request relating to the workload—such as a request to move the workload to an alternate computing environment managed by the manager 434.

The provisioning model 436 and/or the bursting model 438 may be used by the manager 434 and/or workload manager 432 to generate a fingerprint of the workload based on the performance indicators. A fingerprint for a workload may be a general representation of the workload and may, in some instances, incorporate performance indicators for the workload in multiple time increments and across various computing environments. Fingerprints may dimensionally reduce performance indicators to facilitate comparison between different workloads, which may be executing in different computing environments. In some implementations, the provisioning model 436 may be used to provide workload fingerprints to the workload manager 432 for use by the workload manager 432 and/or the manager 434.

At block 504, the provisioning model 436 may be used (e.g., by the manager 434 and/or workload manager 432) to identify one or more comparable workloads based on the performance indicators in the first computing environment. For example, the workload manager 432 may utilize the provisioning model 436 to classify the workload. In some examples the workload manager 432 may use a neural network to identify similar workloads. Other methods, such as clustering or transfer learning may also be used by the workload manager 432 and/or the manager 434 to identify similar workloads using the provisioning model 436. A similar workload may generally use a similar amount of resources, have a similar volume or number of I/O requests, have a similar usage pattern, and/or have other similar characteristics. In some implementations, the workload manager 432 may utilize the provisioning model 436 to attempt to identify similar workloads that have had instances in both the first computing environment and additional computing environments. In some instances, the provisioning model 436 may be used to identify similar workloads based on the fingerprint of the workloads, without reference to previously or currently executing instances of the workloads.

At block 506, the workload manager 432 and/or the manager 434 generate a suggested resource allocation for the workload in a second architecture based on characteristics of the one or more comparable workloads. In some examples, the workload manager 432 and/or the manager 434 may utilize the provisioning model 436 to generate the suggested resource allocation. Resource allocation may include, in some examples, memory allocation, number and types of processors available, and size of the instance. The second architecture may be defined as a specific computing environment. For example, an administrative user may specifically request an instance of the workload at a specific three-tiered cloud environment. Where the suggested instance is constrained, the workload manager 432 may identify, within the provisioning model 436, instances of comparable workloads executing at the specific three-tiered cloud environment, or another three-tiered cloud environment with similar characteristics, as a baseline for the suggested resource allocation for the workload. Additionally or instead, the workload manager 432 may use the computing environment data 442 or a subset of the computing environment data 442 and the provisioning model 436 to select among available pre-configured instances in the second computing environment or to acquire additional data about available compute resources at the second computing environment.

Where the suggested instance is not constrained by a specific computing environment, the workload manager may utilize the provisioning model 436 to identify particular (e.g., the most efficient) instances of comparable workloads in generating a suggested resource allocation. An efficient instance may be defined by the user but may be, for example, an instance allocated enough computing resources to meet performance parameters of the workload while costing the least and/or using the least amount of computing resources. Other factors may be used by the workload manager 432, either explicitly or implicitly, in generating a suggested resource allocation. For example, the provisioning model 436 may incorporate, either implicitly or explicitly, information about instances of the workload already executing, load balancing, available reserved instances, location of data used by the workload, security parameters, etc.

The suggested resource allocation may include, for example, a suggested computing environment, a suggested pre-configured instance (e.g., a vendor defined "large" instance with a defined allocated amount of compute resources), number of instances, a suggested custom instance, duration of the instance (e.g., whether the instance is configured as a spot instance), instance type (e.g., VM or container), etc. In some implementations, the workload manager 432 may further automatically create an instance with the suggested resource allocation at the second computing environment. When creating an instance with the suggested resource allocation, the workload manager 432 may terminate the workload at the first computing environment (e.g., to right size an instance at the first computing environment) or may create the instance at the second computing environment in addition to the workload at the first computing environment.

Figure 6:
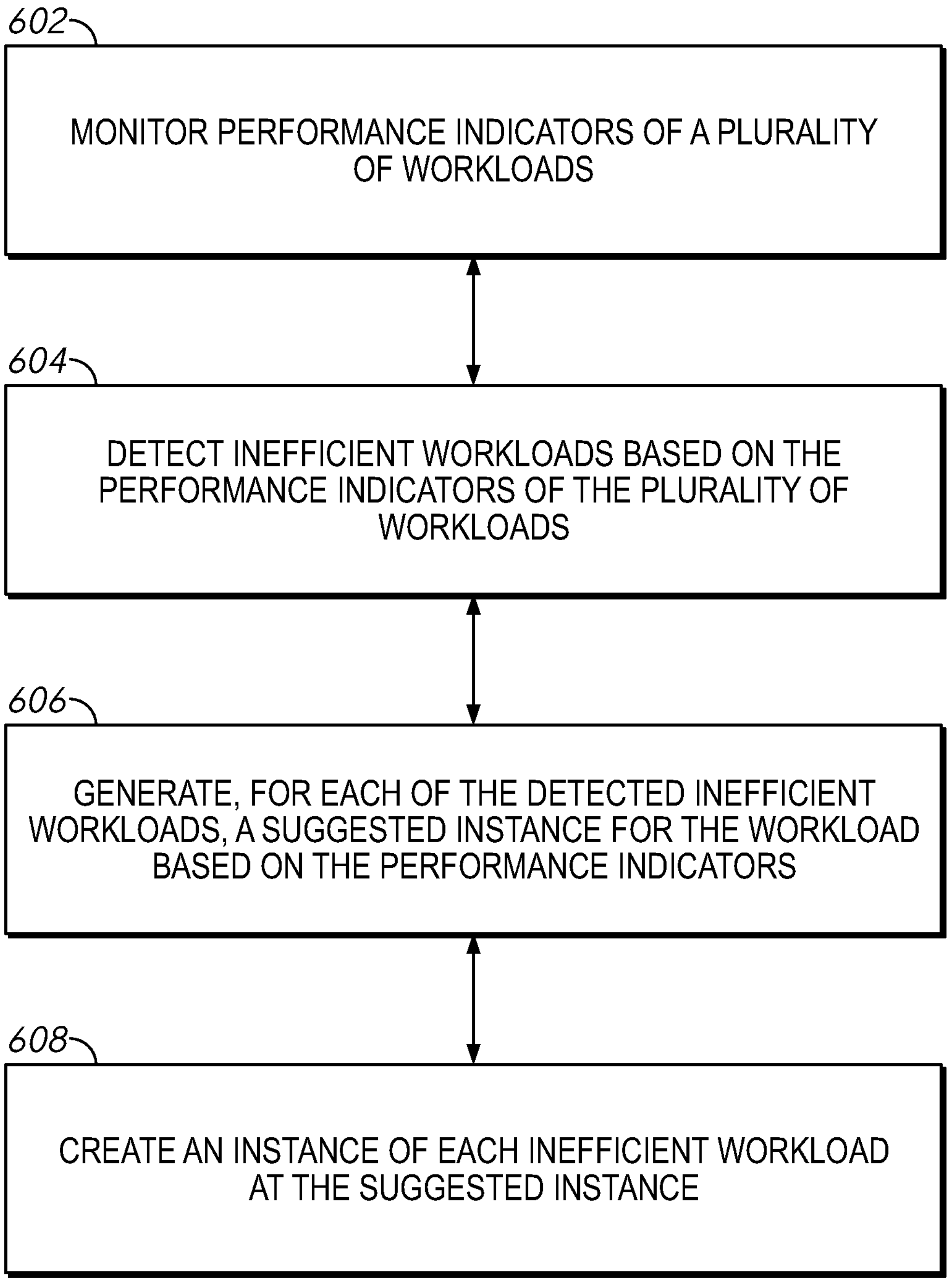
FIG. 6 shows a flow chart for monitoring workloads in accordance with embodiments of the present disclosure.

FIG. 6 shows a flow chart for monitoring workloads managed by a workload manager 432 at a central computing system 430. The steps in FIG. 6 may be performed, in some examples, by the workload manager 432 at the central computing system 430. At block 602, the workload manager 432 monitors computer resource usage of a plurality of workloads. The workload manager 432 may monitor other performance indicators at block 602, including, for example, temporal patterns in resource usage.

At block 604, the workload manager 432 detects a subset of workloads of the plurality of workloads for reconfiguration based on the computing resource usage of the plurality of workloads. The subset of workloads may be, for example, inefficient workloads identified by comparing the computing resource usage of the plurality of workloads to computing resources allocated to the plurality of workloads. Inefficient workloads may be, for example, overprovisioned workloads allocated more processing and memory resources than used by the workload. The workload manager 432 may also detect underprovisioned workloads that could benefit from additional processing and memory resources, constrained workloads, or bully workloads. The workload manager 432 may identify inefficient workloads based on a comparison between resource usage of the workload and resources allocated to the workload. For example, a workload may be overprovisioned when the difference between the resources allocated to the workload and the resource usage of the workload remains above a threshold value for a period of time reflected by the performance indicators. The workload manager 432 may also identify workloads that could be executed at alternative computing environments to improve performance and/or save resources. In some implementations, the workload manager 432 may also identify workloads that are likely to become inefficient based on, for example, usage or demand patterns for the application of the workload. Accordingly, the workload manager 432 may search for an configure spot instances of the workload to be used at some future time to keep the workload from becoming inefficient. This may be referred to as bursting the workload.

At block 606, the workload manager 432 generates, for each of the subset of workloads, a suggested instance for the workload based on the computing resource usage. The workload manager 432 may generate the suggested instance for each of the inefficient workloads using some or all of the steps described in FIG. 5. For example, the workload manager may utilize the performance indicators and the provisioning model 436 to generate a suggested instance for a workload. For each inefficient workload, the workload manager 432 may utilize the provisioning model 436 and the performance indicators to identify one or more comparable workloads and generate a suggested resource allocation for the workload based on characteristics of the one or more comparable workloads. The suggested resource allocation for the inefficient workloads may, however, be a different resource allocation in the same computing environment as the inefficient workload. For example, the workload manager 432 may utilize the provisioning model 436 to suggest an instance of a workload with fewer allocated resources at the same computing environment for an overprovisioned workload. The workload manager 432 may utilize the performance indicators and the bursting model 438 for some subsets of workloads that may benefit from spot instances. For example, workloads with regular demand patterns that become inefficient due to predictable changes in demand may be right sized by configuring spot instances of the workload as suggested by the bursting model 438. In some cases, suggested instances for an inefficient workload may include both updated suggested instances generated by the provisioning model and spot instances generated using the bursting model 438.

The suggested instance generated at block 606 may be suggested to replace the currently executing inefficient workload or may be suggested in addition to the currently executing workload. For example, the workload manager 432 may identify an instance that is overprovisioned. In this case, the workload manager 432 may suggest reconfiguring the current instance or replacing the current instance with the suggested smaller instance. In other examples, such as when the workload manager 432 generates suggested spot instances for bursting the workload, the suggested instances may be in addition to an instance that could become underprovisioned or otherwise inefficient without the additional instances.

When generating a suggested spot instance, the workload manager 432 may utilize the bursting model 438, the provisioning model 436, the workload data 440, and/or the computing environment data 442. For example, the workload manager 432 may access the workload data 440 to determine the usage pattern for the workload and the computing environment data 442 to determine which computing environments have available spot instances as well as pricing for the spot instances. The workload manager 432 may further use the bursting model 438 to determine resource allocation for the spot instances, where the bursting model 438 may, in some instances, utilize the provisioning model 436.

At block 608, the workload manager 432 right-sizes each of the detected inefficient workloads by creating an instance of each workload of the subset of workloads using the suggested instance or instances generated at block 606. In some implementations, the workload manager 432 may continue to monitor workloads and the steps of FIG. 6 may be repeated if the workload continues to be inefficient.

Figure 7:
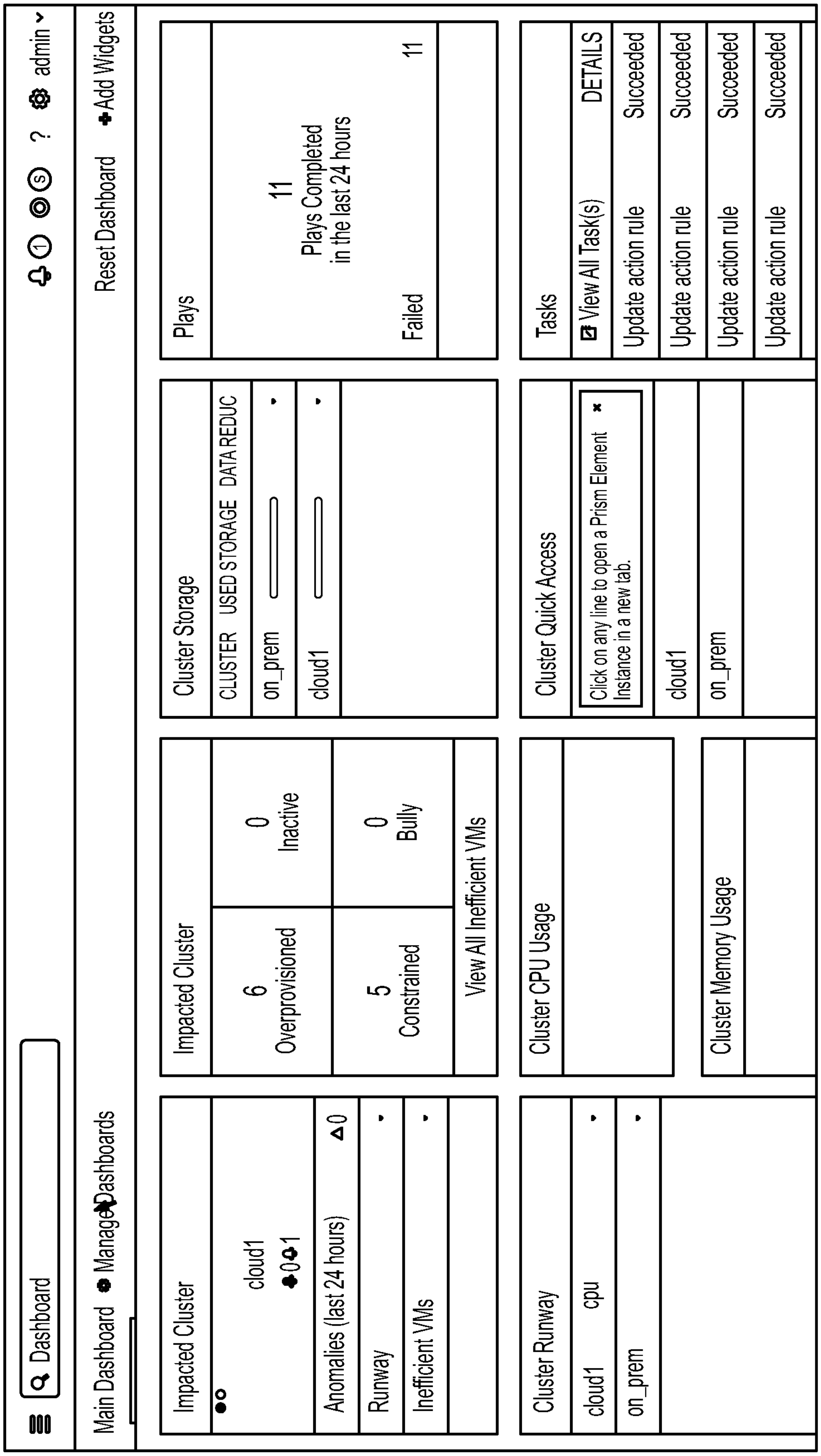
FIG. 7 shows a user interface for monitoring workloads across architectures in accordance with embodiments of the present disclosure.

FIG. 7 shows a user interface for monitoring workloads across computing environments in accordance with one embodiment. The user interface may be provided at the manager interface 104, and may depict various compute instances. The interface may show overprovisioned, inactive, constrained, and bully instances detected by the workload manager 432. The user interface may show resource usage at a particular computing environment or may show instances across computing environments and associated with specific workloads. For example, the user interface may show data for all instances of workloads associated with an application and, accordingly, may display data about multiple computing environments and workloads at multiple computing environments. In other implementations, the user interface may show data about a particular computing environment and all workloads executing at the environment managed by the workload manager 432. For example, the user interface shown in FIG. 7 shows computing resource usage and statistics about workloads at a cloud computing system (cloud1) and an on premises computing cluster (on_prem). Such data may be obtained from computing environment data 442 and workload data 440, in some examples.

The user interface shown in FIG. 7 may also be utilized to initiate steps performed by the workload manager 432, such as those described in FIG. 5 and FIG. 6. For example, the user interface shows overprovisioned instances of workloads. In some implementations, the user interface may include selectable options to resize overprovisioned workloads.

Figure 8:
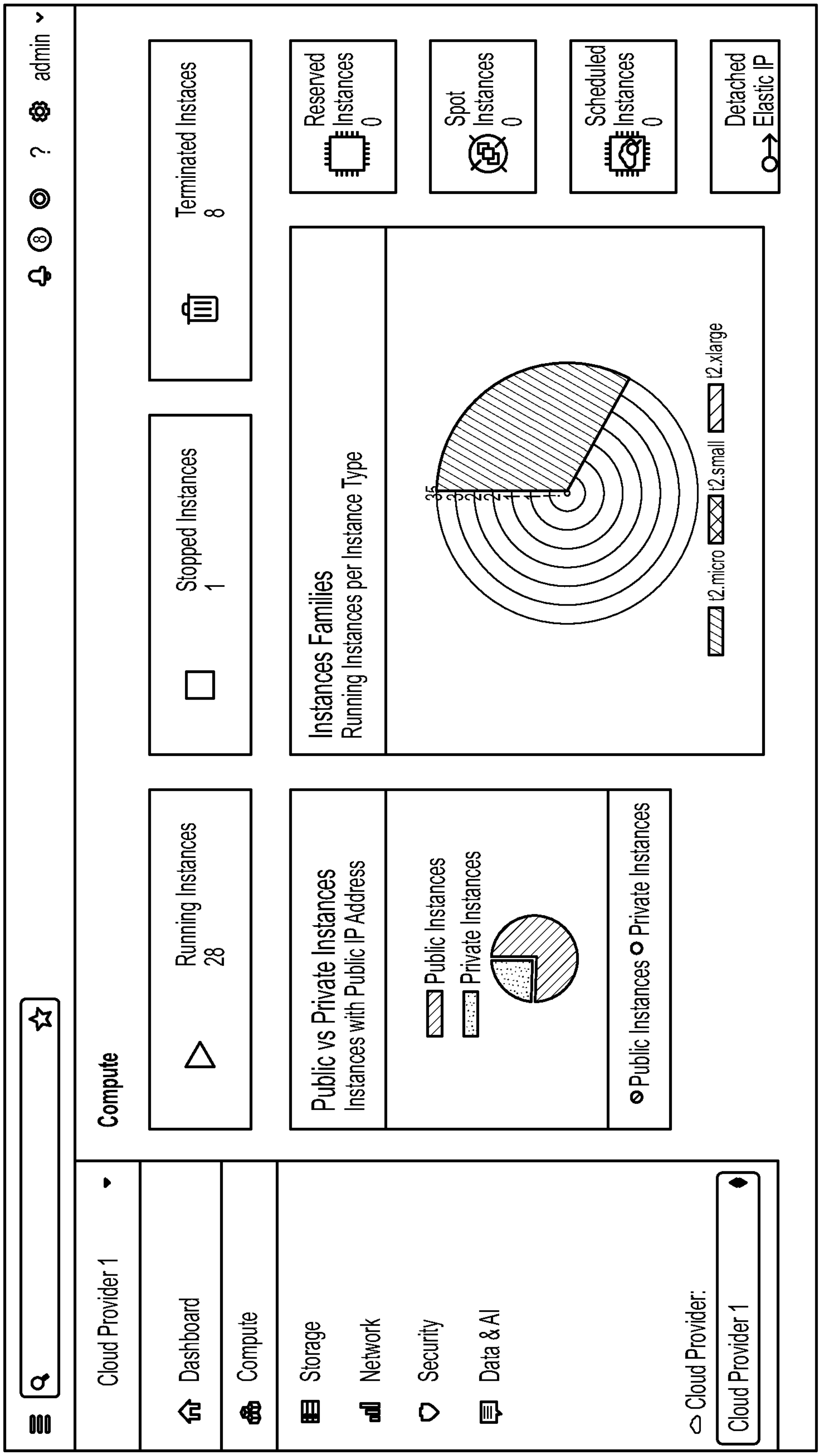
FIG. 8 shows a user interface for monitoring instances in a selected architecture in accordance with embodiments of the present disclosure.

FIG. 8 shows a user interface for monitoring instances of workloads in a selected architecture in accordance with one embodiment. The user interface shown in FIG. 8 may also be provided at the manager interface 104. The user interface may show instances of workloads across multiple computing environments, including, for example, on premises instances and cloud platform instances. The interface may also show other statistics for the instances such as memory usage over time. The user interface shown in FIG. 8 may also show the number of overprovisioned, inactive, constrained, and bully instances detected by the workload manager 432 or show a log of right sizing actions taken by the workload manager 432. A user may also create additional instances using the user interface shown in FIG. 8, or a similar user interface.

While certain components are shown in the figures and described throughout the specification, other additional, fewer, and/or alternative components may be included in the multi-cloud computing system 100 or other computing systems. Such additional, fewer, and/or alternative components are contemplated to be within the scope of this disclosure.

What is claimed is:

1. A method comprising:

receiving a performance indicator of a workload executing on one or more processors of a first computing environment;

identifying one or more comparable workloads based on the performance indicator of the workload in the first computing environment;

generating a suggested resource allocation for the workload in a second computing environment based on characteristics of the one or more comparable workloads, the suggested resource allocation including suggested configurations for one or more additional instances of the workload at the second computing environment, the suggested resource allocation indicating whether an instance of the one or more additional instances is a spot instance, the characteristics comprising a number of I/O requests, usage pattern, resource usage, or combinations thereof;

allocating one or more resources for the instance of the workload at the second computing environment; and creating, at the second computing environment and using the one or more allocated resources associated with the suggested resource allocation, the instance of the workload.

2. The method of claim 1, wherein identifying the one or more comparable workloads comprises using a k nearest neighbors model.

3. The method of claim 1, further comprising:

terminating the workload at the first computing environment when creating the instance of the workload at the second computing environment.

4. The method of claim 1, wherein the instance of the workload at the second computing environment is generated in addition to the workload executing at the first computing environment.

5. The method of claim 1, further comprising:

training a provisioning model using performance indicators for a plurality of workloads executing at the first computing environment and the second computing environment, wherein the one or more comparable workloads are identified using the provisioning model and the suggested resource allocation is generated using the provisioning model.

6. The method of claim 5, further comprising:

updating the provisioning model using the performance indicator of the workload.

7. The method of claim 1, wherein the one or more comparable workloads are identified based on a fingerprint of the workload and fingerprints of a plurality of workloads.

8. The method of claim 1, wherein the second computing environment is selected from available computing environments.

9. The method of claim 1, wherein the suggested resource allocation is a memory allocation, a number and types of processors available allocation, and size of the instance allocation, or combinations thereof.

10. The method of claim 1, wherein identifying the one or more comparable workloads is further based on using a neural network, a provisioning model, clustering, transfer learning, a workload fingerprint, or combinations thereof.

11. The method of claim 1, wherein the suggested resource allocation includes suggested configurations for spot instances of the workload.

12. The method of claim 1, wherein said allocating the one or more resources for the instance of the workload at the second computing environment is based on the suggested resource allocation.

13. The method of claim 1, wherein the suggested resource allocation is different from the one or more comparable workloads.

14. The method of claim 1, wherein the second computing environment has a different architecture than the first computing environment.

15. The method of claim 1, wherein the suggested resource allocation comprises a duration of the instance of the workload.

16. One or more non-transitory computer readable media encoded with instructions which, when executed by one or more processors, cause a computing device to:

receive a performance indicator of a workload executing on one or more processors of a first computing environment;

identify one or more comparable workloads based on the performance indicator of the workload in the first computing environment;

generate a suggested resource allocation for the workload in a second computing environment based on characteristics of the one or more comparable workloads, the suggested resource allocation including suggested configurations for one or more additional instances of the workload in the second computing environment, the suggested resource allocation indicating whether an instance of the one or more additional instances is a spot instance, the characteristics comprising a number of I/O requests, usage pattern, resource usage, or combinations thereof;

allocate one or more resources for the instance of the workload at the second computing environment; and create, at the second computing environment and using the one or more allocated resources associated with the suggested resource allocation, the instance of the workload.

17. The one or more non-transitory computer readable media of claim 16, wherein identifying the one or more comparable workloads comprises using a k nearest neighbors model.

18. The one or more non-transitory computer readable media of claim 10, wherein the instructions further cause the computing device to:

terminate the workload at the first computing environment when creating the instance of the workload at the second computing environment.

19. The one or more non-transitory computer readable media of claim 16, wherein the instance of the workload at the second computing environment is generated in addition to the workload executing at the first computing environment.

20. The one or more non-transitory computer readable media of claim 16, wherein the instructions further cause the computing device to:

train a provisioning model using performance indicators for a plurality of workloads executing at the first computing environment and the second computing environment, wherein the one or more comparable workloads are identified using the provisioning model and the suggested resource allocation is generated using the provisioning model.

21. The one or more non-transitory computer readable media of claim 20, wherein the instructions further cause the computing device to:

update the provisioning model using the performance indicator of the workload.

22. The one or more non-transitory computer readable media of claim 16, wherein the one or more comparable workloads are identified based on a fingerprint of the workload and fingerprints of a plurality of workloads.

23. The one or more non-transitory computer readable media of claim 16, wherein the second computing environment is selected from available computing environments.

24. The one or more non-transitory computer readable media of claim 16, wherein the suggested resource allocation is a memory allocation, a number and types of processors available allocation, and size of the instance allocation, or combinations thereof.

25. The one or more non-transitory computer readable media of claim 16, wherein identifying the one or more comparable workloads is further based on using a neural network, a provisioning model, clustering, transfer learning, a workload fingerprint, or combinations thereof.

26. The one or more non-transitory computer readable media of claim 16, wherein the suggested resource allocation includes suggested configurations for spot instances of the workload.

27. The one or more non-transitory computer readable media of claim 16, wherein said allocating the one or more resources for the instance of the workload at the second computing environment based on the suggested resource allocation.

28. The one or more non-transitory computer readable media of claim 16, wherein the suggested resource allocation is different from the one or more comparable workloads.

29. The one or more non-transitory computer readable media of claim 16, wherein the second computing environment has a different architecture than the first computing environment.

30. The one or more non-transitory computer readable media of claim 16, wherein the suggested resource allocation comprises a duration of the instance of the workload.

31. A system comprising:

a central computing system comprising a processor and memory encoded with executable instructions which, when executed, cause the central computing system to provide a workload manager, the workload manager configured to:

receive a performance indicator of a workload executing on one or more processors of a first computing environment;

identify one or more comparable workloads based on the performance indicator of the workload in the first computing environment;

generate a suggested resource allocation for the workload in a second computing environment based on characteristics of the one or more comparable workloads, the suggested resource allocation including suggested configurations for one or more additional instances of the workload in the second computing environment, the suggested resource allocation indicating whether an instance of the one or more additional instances is a spot instance, the characteristics comprising a number of I/O requests, usage pattern, resource usage, or combinations thereof;

allocate one or more resources for the instance of the workload at the second computing environment; and create, at the second computing environment and using the allocated one or more resources associated with the suggested resource allocation, the instance of the workload.

32. The system of claim 31, wherein the workload manager is further configured to identify the one or more comparable workloads comprises using a k nearest neighbors model.

33. The system of claim 31, wherein the workload manager is further configured to terminate the workload at the first computing environment when creating the instance of the workload at the second computing environment.

34. The system of claim 31, wherein the instance of the workload at the second computing environment is generated in addition to the workload executing at the first computing environment.

35. The system of claim 31, wherein the workload manager is further configured to train a provisioning model using performance indicators for a plurality of workloads executing at the first computing environment and the second computing environment, wherein the one or more comparable workloads are identified using the provisioning model and the suggested resource allocation is generated using the provisioning model.

36. The system of claim 35, wherein the workload manager is further configured to update the provisioning model using the performance indicator of the workload.

37. The system of claim 31, wherein the one or more comparable workloads are identified based on a fingerprint of the workload and fingerprints of a plurality of workloads.

38. The system of claim 31, wherein the second computing environment is selected from available computing environments.

39. The system of claim 31, wherein the suggested resource allocation is a memory allocation, a number and types of processors available allocation, and size of the instance allocation, or combinations thereof.

40. The system of claim 31, wherein identifying the one or more comparable workloads is further based on using a neural network, a provisioning model, clustering, transfer learning, a workload fingerprint, or combinations thereof.

41. The system of claim 31, wherein the suggested resource allocation includes suggested configurations for spot instances of the workload.

42. The system of claim 31, wherein said allocating the one or more resources for the instance of the workload at the second computing environment is based on the suggested resource allocation.

43. The system of claim 31, wherein the suggested resource allocation is different from the one or more comparable workloads.

44. The system of claim 31, wherein the second computing environment has a different architecture than the first computing environment.

45. The system of claim 31, wherein the suggested resource allocation comprises a duration of the instance of the workload.

* * * * *